United States Patent [19]

Ackerman

[11] Patent Number: 5,039,448

[45] Date of Patent: Aug. 13, 1991

[54] PHOTOLUMINESCENT PHOSPHORS
[75] Inventor: John F. Ackerman, Cheyenne, Wyo.
[73] Assignee: General Electric Company, Schenectady, N.Y.
[21] Appl. No.: 363,458
[22] Filed: Jun. 6, 1989

Related U.S. Application Data

[60] Continuation of Ser. No. 303,973, Jan. 30, 1989, abandoned, which is a continuation of Ser. No. 102,817, Sep. 22, 1987, abandoned, which is a continuation of Ser. No. 818,856, Jan. 13, 1986, abandoned, which is a continuation of Ser. No. 653,981, Sep. 24, 1984, abandoned, which is a division of Ser. No. 528,830, Sep. 2, 1983, Pat. No. 4,496,844.

[51] Int. Cl.$^5$ .................. C09K 11/61; C09K 11/67
[52] U.S. Cl. .................. 252/301.4 H; 252/301.4 F
[58] Field of Search .................. 252/301.4 H, 301.4 F

[56] References Cited

U.S. PATENT DOCUMENTS 2,618,531 9/1949 Linblad et al. .................. 23/87

FOREIGN PATENT DOCUMENTS 660397 3/1949 Sweden .

OTHER PUBLICATIONS

Asvestas et al. "Can. J. Chem.," vol. 55, 1977, pp. 1154–1166.
Berg et al "J. Chem. Phys.", vol. 67, No. 5, 1977, pp. 1829–1837.
Wernicke et al "Chem Abstracts", vol. 92, 1980, 206394q.
Low et al "Physics Letters", vol. 44A, No. 7, 1973 pp. 451–452.
Dutrizac et al "Can. J. Chem.", vol. 45, 1967, pp. 2313–2317.
Lister, R. L. and Flengas, S. N., "On the Relationship Between Equilibrium Pressures and the Phase Diagram of a Reactive System", *Canadian Journal of Chemistry*, vol. 43, 1965, pp. 2947–2969.
Dutrizac, J. E. and Flengas, S. N., "Pressure–Temperature Measurements on Alkali- and Alkaline-earth Complex Chlorides of Zirconium and Hafnium", Advance in Extractive Metallurgy Symposium, Paper 24, Apr. 17–20, 1967, pp. 572–599.
"57, Hexahalogenotellurates (IV)" by H. Marshall in *Inorganic Synthesis*, 2(1946), pp. 188–190 (W. C. Fernelius, editor).
Kupka, Hans et al., "Intensity Distribution in the Progressions of Vibronic Transitions of Metal–Ion Complexes", *Molecular Physics*, 1979, vol. 37, No. 6, pp. 1693–1701.
Wernicke, R. et al., "Low Temperature Luminescence Spectra of the $d^{10}s^2$ Complexes $Cs_2MX_6$ (M=Se, Te and X=Cl, Br) the Jahn–Teller Effect in the $\Gamma_{4-}(^3T_{1\mu})$ Excited State", Chemical Physics, vol. 47 (1980) pp. 235–244.
Wheeler, H. L., "Uber Doppelhalogenverbindungen des Tellurs mit Kalium, Rubidium und Casium", Am. J. Sci., 2, 428, 1983, pp. 428–440.
Ackerman, John F., "Preparation and Luminescence of Some [$K_2PtCl_6$] Materials", Mat. Res. Bull., vol. 19, pp. 783–791, 1984.
Lister, R. L. and Flengas, S. N., "The synthesis and Properties of the Anhydrous Hexachlorozirconates of sodium and potassium" *Canadian Journal of Chemistry*, vol. 42, pp. 1102–1105, 1964.
Toptygina, G. M. and I. B. Barskaya, "Alkali Metal and Ammonium Hexachlorozirconates", *Russian Journal of Inorganic Chemistry*, vol. 10, No. 10, pp. 1226–1230, Oct. 1965.
"Preparation of Characteristics of Solid Luminescent Materials", Symposium held at Cornell University, Oct. 24–26, 1946, published under the auspices of the National Research Council, 1948, pp. 1–8, 22–28 and 435–436.

Primary Examiner—Jack Cooper
Attorney, Agent, or Firm—Marvin Snyder; James C. Davis, Jr.

[57] ABSTRACT

An X-ray imaging system includes a phosphor that exhibits a fast-acting photoluminescent response both in luminescing upon X-ray stimulation and ceasing to luminesce upon cessation of X-ray stimulation. The phosphor has the general formula $A_2MX_6$ wherein A is selected from Cs, Rb, Na and K; M is selected from Ti, Zr, Hf and Te; and X is selected from Cl and Br. In one form the phosphor has a purity with respect to naturally-occuring impurities of at least about 98.0 percent (by weight) and is sufficiently deficient of luminescent activators effective only at very low temperatures that the phosphor luminesces at higher temperatures.

5 Claims, 3 Drawing Sheets

PHOTOLUMINESCENT PHOSPHORS

This application is a continuation of application Ser. No. 303,973, filed Jan. 30, 1989, now abandoned, which is a continuation of application Ser. No. 102,817, filed Sept. 22, 1987, now abandoned, which is a continuation of application Ser. No. 818,856 filed Jan. 13, 1986, now abandoned, which is a continuation of application Ser. No. 653,981, filed Sept. 24, 1984, now abandoned, which is a division of application Ser. No. 528,830, filed Sept. 2, 1983, now U.S. Pat. No. 4,496,844.

BACKGROUND OF THE INVENTION

The present invention relates to radiographic X-ray imaging systems and, more particularly, to photoluminescent phosphors especially suitable for use in X-ray imaging systems at temperatures in excess of about 77° kelvin.

X-ray imaging systems are useful for producing images of, for example, internal organs of a human body. The basic principle of their operation involves the passing of X-rays through an object of inquiry (e.g., a human body), which X-rays then impinge on a photoluminescent layer. The internal parts of the object of inquiry absorb some of the X-rays as a function of their structure, whereby the X-ray pattern impinging on the photoluminescent layer is representative of the structure of such internal parts.

The X-ray pattern on the photoluminescent layer stimulates a luminescent (or light) image in the photoluminescent layer. The material of the photoluminescent layer that luminesces is known as a phosphor. It is desirable that the phosphor exhibit a "fast-acting" response to stimulation by X-rays; that is, as used herein, a rapid response both in luminescing upon excitation by X-rays and ceasing to luminesce upon cessation of X-ray excitation. This is because typical X-ray imaging systems incorporate sophisticated and expensive digital computer apparatus that are most economically operated at high speed.

Typical known phosphors that are composed of ceramic exhibit a relatively slow-acting response to X-ray stimulation. This increases the expense of operation of a typical imaging system including complex digital computer apparatus that is costly to operate. It would thus be desirable to provide a phosphor that exhibits a fast-acting response to X-ray stimulation.

A further class of known phosphors are effective only at temperatures below about 77° kelvin and are doped with luminescent activators. These phosphors comprise, for example: $Cs_2ZrCl_6$ doped with one of Ir, Os, Re. Pt, Mo, Ru or U; $Cs_2HfCl_6$ doped with Os, Mo or Re; and $Cs_2SnCl_6$ doped with Ir, U, Re or Os. These doped phosphors are known to exhibit luminescence at about 4.4° kelvin (liquid helium temperature), but not at about 77° kelvin (liquid nitrogen temperature) or higher temperatures due to a parasitic effect within the host material. Accordingly, they are not suitable for use in typical X-ray imaging systems, at least without employing expensive cooling apparatus to maintain the required cold temperature.

OBJECTS AND SUMMARY OF THE INVENTION

An object of the present invention is to provide an X-ray imaging system utilizing a phosphor with a fast-acting response to X-ray stimulation.

A further object of the invention is to provide an X-ray imaging system utilizing an undoped phosphor that luminesces at temperatures above about 77° kelvin.

The foregoing objects are achieved in an X-ray imaging system, which, in a preferred form, comprises a photoluminescent layer including a phosphor of the general formula:

$$A_2MX_6$$

wherein A is cesium (Cs), Rubidium (Rb), potassium (K) or sodium (Na);

M is titanium (Ti), zirconium (Zr), hafnium (Hf) or tellurium (Te); and

X is chlorine (Cl) or bromine (Br).

The phosphor preferably has a purity with respect to naturally-occurring impurities of at least about 98.0 percent by weight and is sufficiently deficient of luminescent activators effective at temperatures below about 77° kelvin that the phosphor exhibits luminescence at temperatures greater than about 77° kelvin.

An X-ray source is included and is adapted to expose the photoluminescent (PL) layer to X-rays passing through an object and thereby to stimulate emission of a light image from the PL layer. The light image is then read by a photodetection means, such as a photodiode device.

BRIEF DESCRIPTION OF THE DRAWINGS

While the specification concludes with claims setting forth the particular features of the invention which are deemed to be novel, it is believed that the organization and method of using the invention will be best understood from considering the following description in connection with the drawings, in which:

DESCRIPTION OF THE PREFERRED EMBODIMENTS

Figure 1:
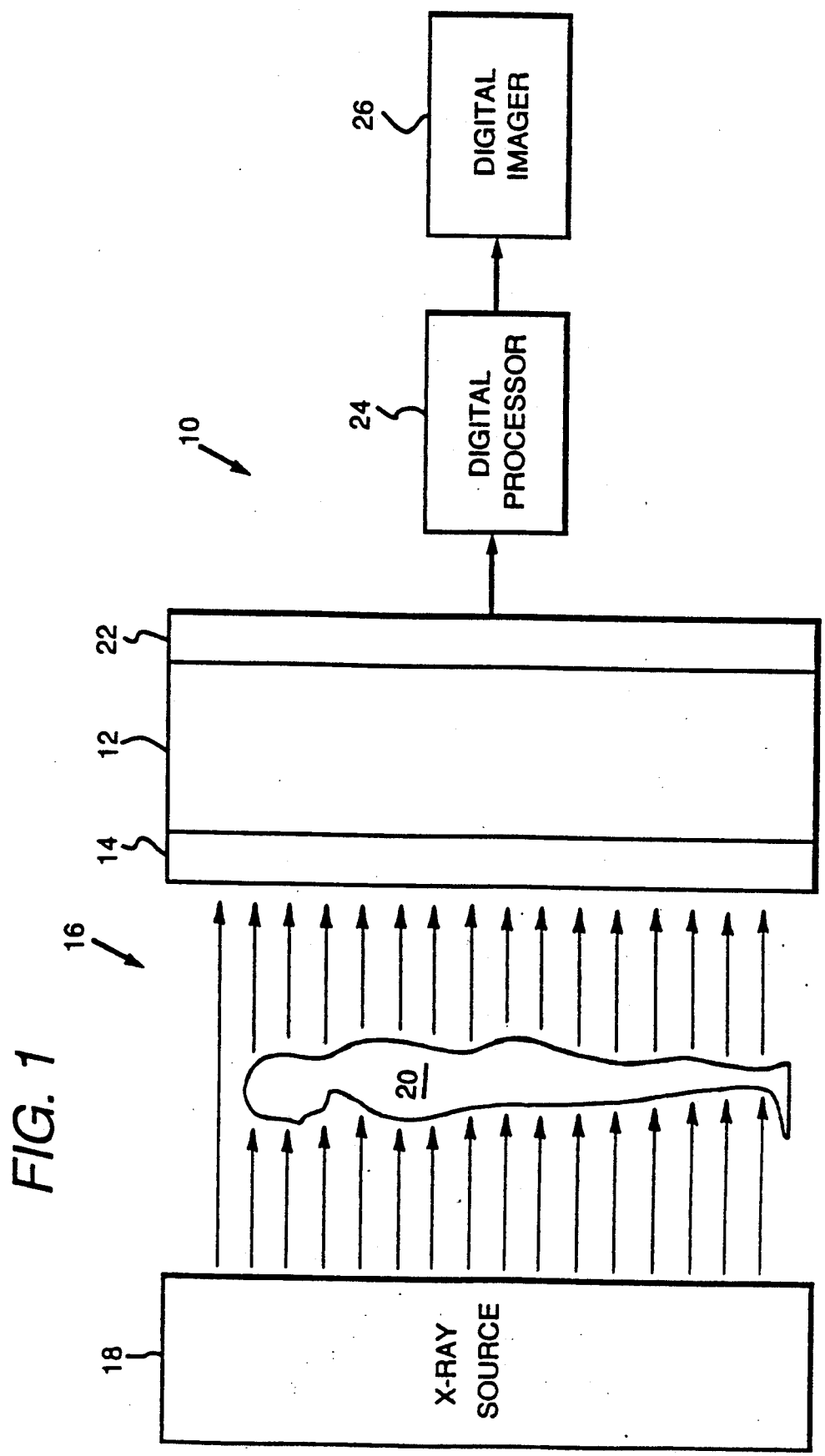
FIG. 1 is a schematic illustration partially in block diagram form of a radiographic imaging system in accordance with the present invention.

Referring to the drawings, FIG. 1 schematically illustrates a radiographic imaging system 10 suitable for real time use and which utilizes a photoluminescent layer (PL) 12 incorporating one or more of the phosphors of the present invention, which are described in detail below. PL layer 12 is held in position by a physical support 14 that is transparent to X-rays, and is adapted to receive X-rays 16 from an X-ray source 18. X-rays 16 are transmitted through an object of investigation 20, such as a human body. PL layer 12 is stimulated into photoluminescence by X-rays 16 that have passed through object 12 at different levels and exhibits a light image representative of the internal parts of object 20. A photodetection means 22 is provided adjacent PL layer 12 so as to convert the light image information on PL layer 12 to a digitized electrical image, which is then transmitted to digital processor 24 in order to enhance the "quality" (i.e. clarity) of the digitized electrical image. The resulting digitized electrical image from digital processor 24 is then transmitted to a digital imager 26 in order to provide a final digitized electrical image correcting certain deficiencies found in the original light image exhibited on PL layer 12.

Photodetection means 22 may comprise, by way of example, a photodiode device, a photomultiplier device, or a charge-coupled device, each of which are known in the art. Digital processor 24 and digital imager 26 each may suitably comprise conventional devices.

PL layer 12 preferably comprises a monocrystalline layer of one or more of the inventive phosphors that are described in detail below. Alternatively, PL layer 12 may comprise a polycrystalline layer of one or more of the inventive phosphors in particle form that are bound within an optically isotropic plastic layer, such as a polyvinyl napthalene toluene copolymer. A further alternative embodiment of PL layer 12 comprises one or more of the present inventive phosphors in polycrystalline, particle form, suitably adhered to support 14 of Mylar plastic film, for example, by an adhesive such as polymethylmethacrylate.

Figure 2:
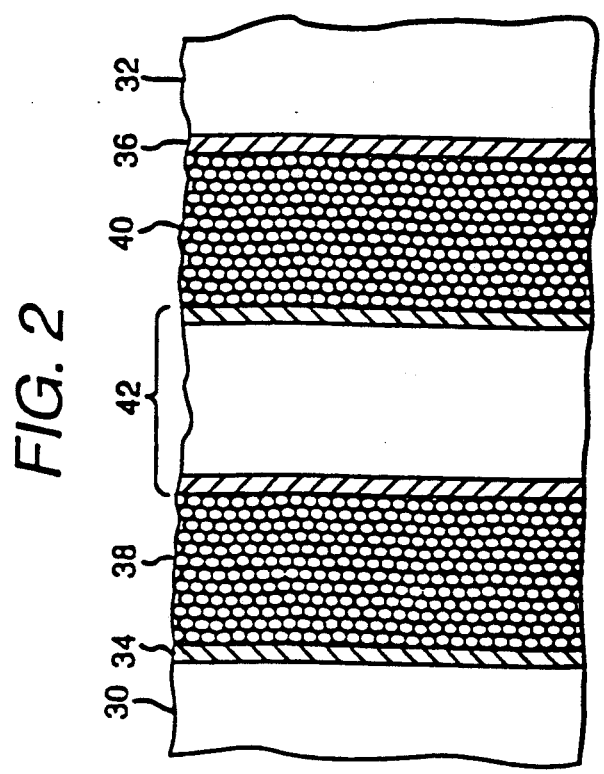
FIG. 2 is a cross-sectional view illustrating an X-ray screen construction utilizing the phosphor materials of the present invention.

In FIG. 2 there is depicted a self-supporting representative X-ray screen construction according to the present invention, that is useful to permanently record a photoluminescent light image on photographic film. Specifically, the X-ray screen construction of FIG. 2 utilizes a pair of flexible backing layers 30 and 32 along with a pair of optical reflecting layers 34 and 36 and a further pair of photoluminescent layers 38 and 40, as illustrated, to expose an intermediate, double-emulsion photographic film member 42. As used herein, "photodetection means" is intended to embrace such photographic film member 42.

In accordance with the present invention, the photoluminescent layers used in the above-described radiographic imaging system (FIG. 1) and X-ray screen construction (FIG. 2) include at least one phosphor of the general formula:

$$A_2MX_6$$

wherein, A is selected from the group consisting of cesium, rubidium, potassium, or sodium; M is selected from the group consisting of titanium, zirconium, hafnium or tellurium; and X is selected from the group consisting of chlorine or bromine.

In a more preferred embodiment of the invention A can be cesium, rubidium, or potassium; M can be zirconium, hafnium, or tellurium; and X is again selected from the group consisting of chlorine and bromine.

In a still more preferred embodiment of the invention, the phosphor composition is one in which A is cesium or rubidium; M is zirconium, hafnium, or tellurium; and X is chlorine or bromine.

In a particularly preferred aspect of the invention the phosphor composition of the photoluminescent layer can be characterized by the general formula:

$$A_2M'_{1-x}M''_xX_6$$

wherein A, M and X are defined above. Illustrative compositions include:

$Cs_2Hf_{1-x}Te_xCl_6$ and
$Cs_2Zr_{1-x}Te_xCl_6$ where it is especially preferred that $0.005 \leq x \leq 0.1$ Phosphors of the foregoing formulas constitute stoichiometrically different materials that are related in that they crystallize with the cubic $K_2PtCl_6$ type structure. Each phosphor preferably has a purity with respect to naturally-occurring impurities of at least about 98.0 percent by weight. By "naturally-occurring impurities" is meant impurities typically found in the reagents used to produce a phosphor of the present invention. The importance of attaining the foregoing, high degree of purity in the present phosphor (or phosphors) is made apparent from the graph of FIG. 3, illustrating the luminescent output of a phosphor of the present invention for different degrees of naturally-occurring impurities (by weight).

Figure 3:
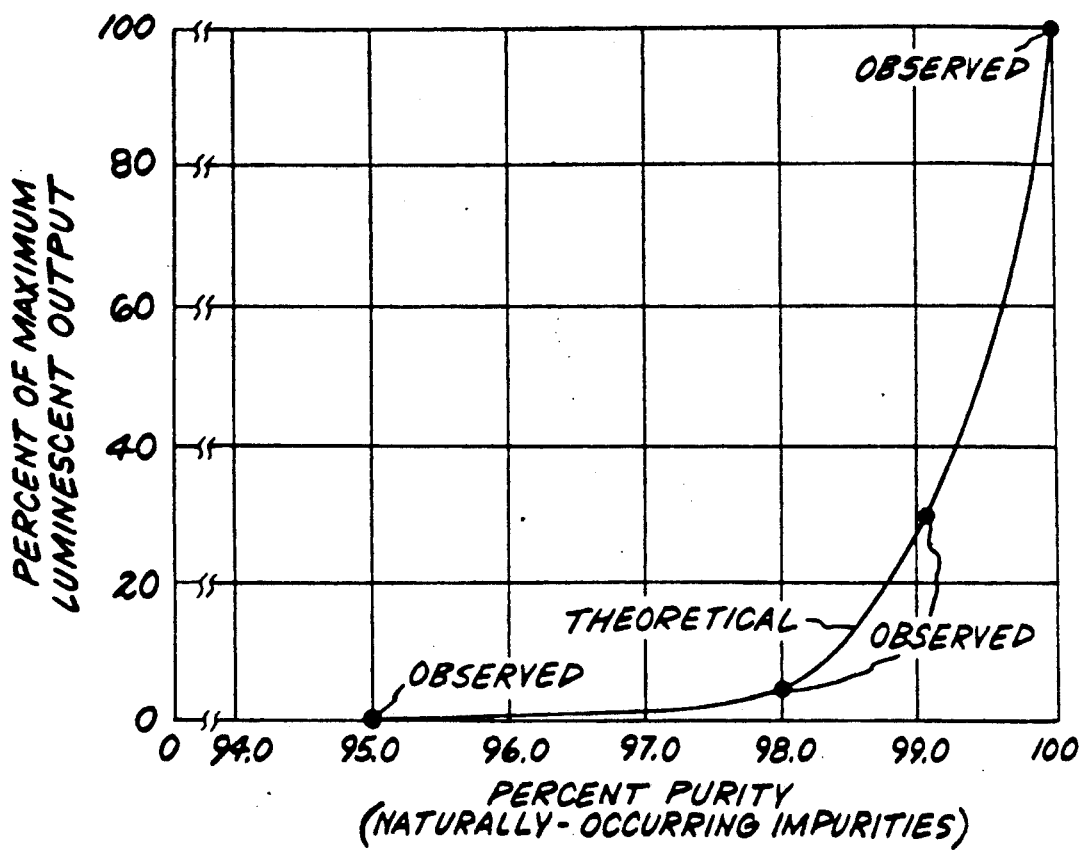
FIG. 3 is a graph of luminescent output versus purity of a particular phosphor of the present invention.

From FIG. 3 it can be appreciated that a phosphor of the present invention exhibits a luminescent output of about 5 percent of the maximum possible when its purity with respect to naturally-occurring impurities is about 98.0 percent. The higher the purity of the phosphor, the higher its luminescent output. It is particularly preferred that the purity of the foregoing phosphor be about 99.99 percent, which advantageously results in the attainment of about 99.9 percent of the maximum luminescent output. The data of FIG. 3 has been verified for the following phosphors: $Cs_2ZrCl_6$, $Cs_2HfCl_6$ and $Cs_2Zr_{.99}Te_{.01}Cl_6$. It is thus reasonable to expect similar performance from the other phosphors of the foregoing formula.

Figure 4:
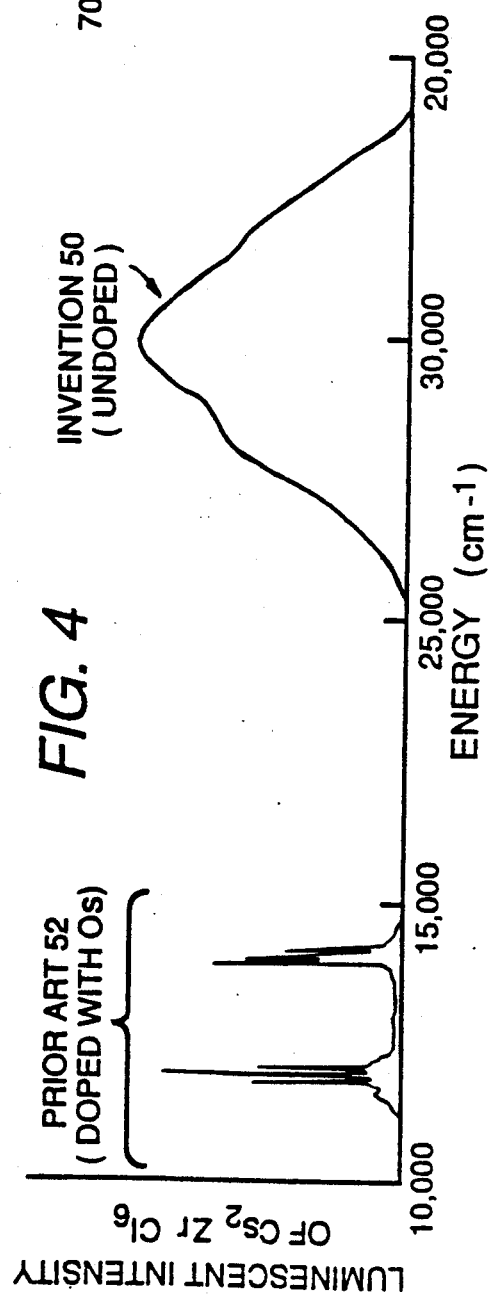
FIG. 4 is a graphical illustration of the luminescent spectral output of a phosphor of the present invention as well as a phosphor according to the prior art that includes a luminescent activator.

In order for the phosphors of the present invention to luminesce at temperatures above about 77° kelvin, the phosphors must additionally be sufficiently deficient, or free of, the luminescent activators discussed above with respect to one class of prior art phosphors. Such luminescent activators do not occur naturally in the reagents used to produce the present phosphors. As noted above, these prior art luminescent activators are effective at about 4.4° kelvin (liquid helium temperature) but not at about 77° kelvin (liquid nitrogen temperature). A tolerable impurity level of a luminescent activator is one that is sufficiently low whereby the phosphor exhibits luminescence at temperatures of about 77° kelvin or above. The maximum tolerable impurity level of a prior art luminescent activator will be apparent to those skilled in the art based upon (1) the above-discussed, distinct temperature range wherein a sufficiently pure phosphor luminesces (i.e., at temperatures greater than about 77° kelvin) and (2) the unique luminescent spectrum exhibited by a sufficiently pure sample of the present phosphor $Cs_2HfCl_6$, by way of example. This particular phosphor, when sufficiently deficient of luminescent activators effective only at temperatures below about 77° kelvin (and sufficiently pure with respect to naturally-occurring impurities), exhibits the luminescent spectrum 50, shown in FIG. 4, whereas a phosphor with the same formula (i.e. $Cs_2HfCl_6$), when doped with the prior art luminescent activator Os exhibits the distinctly different luminescent spectra 52, shown in FIG. 4. The spectrum 50 comprises a single continuous broad emission, while the spectra 52 comprises a multiplicity of individual narrow band emissions.

A preferred method of preparing the present phosphor of the general formula $A_2MX_6$, as discussed in detail above, comprises thoroughly mixing two moles of alkali metal halide (AX) such as CsCl with one mole of a non-alkali metal halide (MX$_4$) such as HfCl$_4$ in a sealed evacuated silica tube, and then raising this mixture at least momentarily to about 850° C., preferably at a rate limited to about 25° C. per hour. This procedure produces one mole of Cs$_2$HfCl$_6$. The mixture of alkali metal halide and non-alkali metal halide can be raised in temperature at rates other than the preferred rate of 25° C. per hour; a faster rate results in a more volatile, possibly explosive, reaction between the alkali metal halide and the non-alkali metal halide, and a slower rate requires more time to produce the phosphor. Lesser maximum temperatures can be used, although the mixture would need to be maintained at the lesser maximum temperature for a longer time to permit the phosphor to be produced. For example, the alkali metal halide and non-alkali metal halide mixture could be held at about 805° C. for a period of about 24 hours to produce the desired phosphor.

The foregoing processing temperatures are considerably lower than those required to produce prior art ceramic phosphors and, as such, the phosphors of the present invention are more economical to fabricate that ceramic phosphors. The present invention comprises the mixing of one mole of alkali metal halide with two moles of non-alkali metal halide in an aqueous solution, with the desired phosphor precipitating from the aqueous solution. This procedure, however, typically results in a phosphor having a higher impurity level than a phosphor produced according to the foregoing procedure involving heating of the alkali metal halide and non-alkali metal halide mixture.

Figure 5:
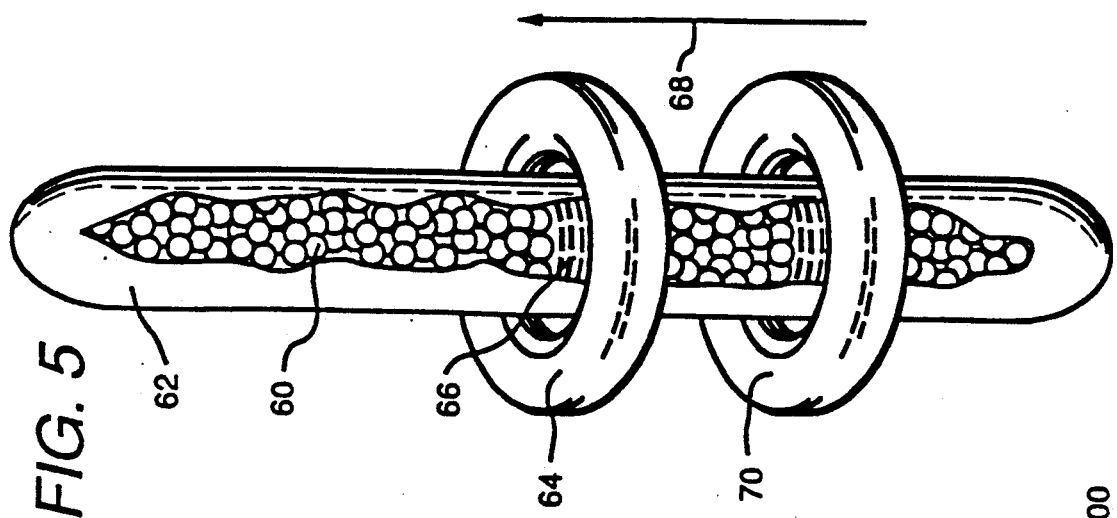
FIG. 5 is a schematic depiction of a zone refining apparatus useful in purification of the phosphor of the present invention.

Phosphors made by the foregoing phosphor-producing procedures are polycrystalline in form and typically contain naturally-occurring impurities. A preferred technique for purifying the resulting polycrystalline mass is the technique of zone refining, which may be carried out in the apparatus schematically illustrated in FIG. 5. According to the technique of zone refining, a polycrystalline mass of phosphor 60 is placed within a silica (or other suitable refractory material) tube 62. A heater 64 surrounds tube 62 and is effective to transform the portion of polycrystalline mass 60 in the vicinity of heater 64 into molten metal 66. Impurities from polycrystalline mass 60 then diffuse into molten metal 66. Heater 64 is moved in the direction of arrow 68 from one end of tube 62 to the other. Further heaters, such as heater 70, can be employed so as to reduce the overall purification time, with six heaters being preferred. Alternatively, three heaters could be passed from one end of tube 62 to the other, by way of example.

By using the foregoing technique of zone refining, phosphors with a purity of about 99.99 percent (by weight) with respect to naturally-occurring impurities have been obtained. Further details of the technique of zone refining are contained in *Pfann Zone Melting*, 2nd Ed., New York: Wiley Interscience (1965), which is incorporated herein by reference.

After purification, the polycrystalline mass of phosphor can be used in its existing particle form. Alternatively, the pholycrystalline mass can be formed into a single crystal in accordance with the Bridgman crystallization technique, by way of example. This technique (not illustrated herein) involves placement of the polycrystalline mass into a specially shaped tube and then inserting the tube into a furnace at a temperature preferably in the range from about 810° C. to about 830° C. The Bridgman technique is described more fully in W. O. Lawson and S. Nielsen, *Preparation of Single Crystals*, London: Butterworths Scientific Publications (1958) (see especially discussion commencing on page 14), which is incorporated herein by reference. After crystallization, the resulting crystal is cut into a desired shape for use in a radiographic imaging system such as described above.

Figure 6:
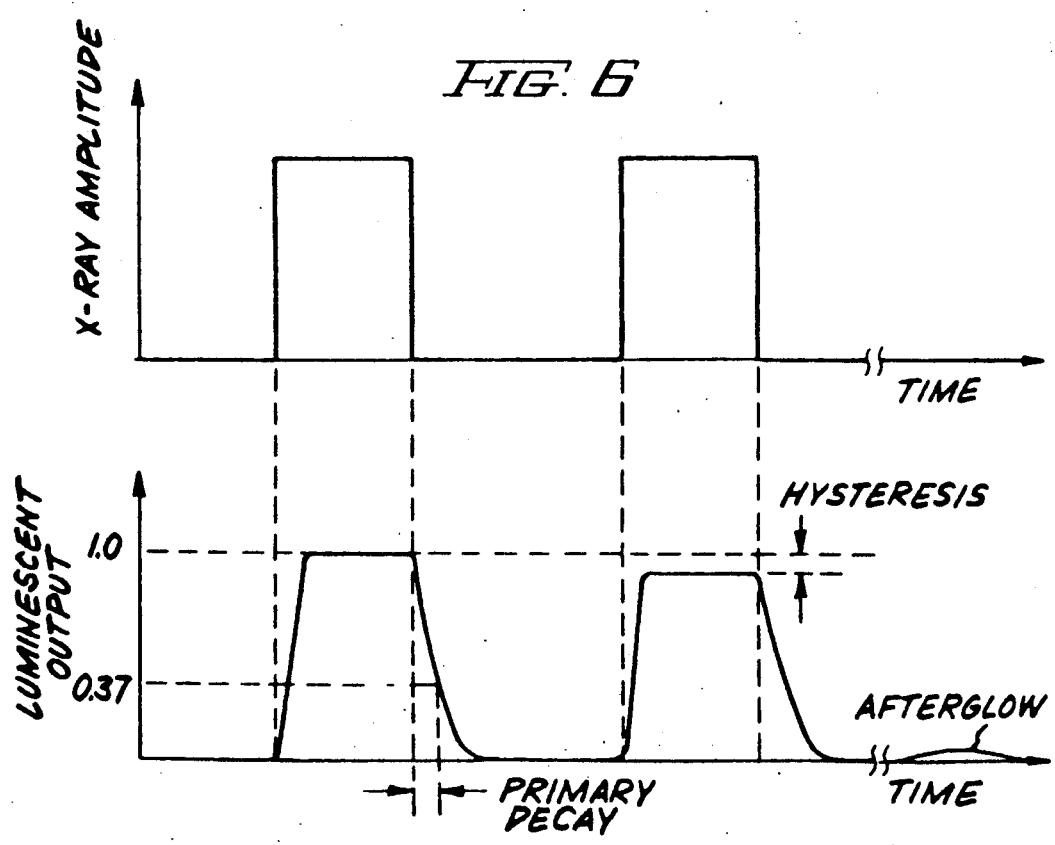
FIG. 6 is an illustration of luminescent output intensity of a phosphor of the present invention in response to X-ray stimulation.

Phosphors of the present invention have been found to exhibit highly desirable characteristics for use in radiographic imaging systems, as explained presently with reference to FIG. 6. Intervals of X-ray emission from an X-ray source (not shown) are depicted in FIG. 6 along with the luminescent output of a phosphor that is stimulated into photoluminescence by these X-rays. Important characteristics of the luminescent output are denoted on the luminescent output waveform and discussed below.

Of particular importance in determining the speed at which X-ray imaging may occur is the "primary decay" of the luminescent output, which is the time it takes for the luminescent output to decay to 1/e (about 37 percent) of its maximum value after cessation of X-ray stimulation. Of considerable importance also is the "afterglow" of the phosphor, which is a spurious or unwanted continuation of luminescence of the phosphor after a relatively long interval after cessation of an X-ray stimulation signal. Of importance in resolution quality of a radiographic image is the "hysteresis", or change in maximum luminescent output, between successive periods of photoluminescence of a phosphor. The foregoing characteristics of the present phosphors are tabulated as follows for various, preferred phosphors of the present invention, along with the characteristic of phosphor efficiency in terms of percent of the industrial standard phosphor CsI:Tl.

| Phosphor | Primary Decay | Afterglow @ 10 msec. | Hysteresis | Efficiency |
|---|---|---|---|---|
| Cs$_2$HfCl$_6$ | <0.1 msec. | 1% | <1% | 40% |
| Cs$_2$ZrCl$_6$ | <0.1 msec. | 0.5% | <1% | 40–55% |
| Cs$_2$HfBr$_6$ | <0.1 msec. | 1% | 2% | 45% |

EXAMPLE 1: Preparation of Cs$_2$ZrCl$_6$ in Single Crystal Form

A single crystal of 11.38 g Cs$_2$ZrCl$_6$ was prepared by first placing 4.669 g of ZrCl$_4$ of 99.99 percent purity into a clear, dry ½-inch diameter fused silica tube with 6.72 g of CsCl of 99.9999 purity. The purity levels in these examples are in terms of weight and concern naturally-occurring impurities. The tube and contents were evacuated to 10$\mu$ Hg, at which point the tube was sealed off from the vacuum line at an overall tube length of 8 inches. The tube was placed in a tubular resistance furnace equipped with explosion shields. The temperature was raised at 25° C. per hour to 830° C. and maintained at this temperature for two hours. Then the furnace was cooled at 100° C. per hour to room temperature (21° C.) and the tube removed from the furnace. The tube was opened carefully to allow any HCl gas present to safely escape and then the polycrystalline Cs$_2$ZrCl$_6$ was mechanically extracted.

This polycrystalline mass of Cs$_2$ZrCl$_6$ was ground in an agate mortar and then placed in a clean, dry ½-inch diameter silica tube for purification in accordance with the zone refining technique. The tube was evacuated to 1$\mu$ Hg then sealed off from the vacuum source. The tube was raised at ½-inch per hour through two heated zones each being 9/16-inch in diameter x ½-inch length and spaced 3 inches from each other. The temperature at the center of the zones was 830° C. This purification procedure was repeated for two more passes. The tube was again carefully opened and the purified polycrystalline $Cs_2ZrCl_6$ extracted.

For crystal growth, the pure $Cs_2ZrCl_6$ was placed in a clean, dry tapered silica tube (Bridgeman type) and evacuated to 1 Hg. The tube was sealed and then lowered at ¼ inch per hour through a furnace at 830° C., the furnace having a uniform temperature zone at least 10 inches length by 1-inch diameter. After this heating step, a single crystal of $Cs_2ZrCl_6$ was mechanically extracted after opening the tube.

EXAMPLE 2: Preparation of $Cs_2HfCl_6$ in Single Crystal Form

A single crystal of 13.12 g $Cs_2HfCl_6$ was prepared in accordance with the procedure of Example 1, above, as modified by using 6.40 g of $HfCl_4$ of 99.99 percent purity in place of the 4.66 g of $ZrCl_4$.

EXAMPLE 3: Preparation of $Cs_2HfBr_6$ in Particle Form

The phosphor $Cs_2HfBr_6$ in particle form was prepared by first mixing 4.98g of $HfBr_4$ of 99.999 percent purity with 4.26g of CsBr and placing the resulting mixture into a clean, dry silica tube 1 inch in length. The tube was evacuated to 10μ Hg and then sealed. The tube and its contents were heated to 830° C. at 25° C. per hour in a furnace equipped with explosion shields. After maintaining the tube and contents at 830° C. for 1 hour, the tube was cooled at 100° C. per hour to room temperature (21° C.). The tube was then carefully opened and the polycrystalline $Cs_2HfBr_6$ extracted.

EXAMPLE 4: Preparation of $Cs_2TeCl_6$ in Particle Form

The phosphor $Cs_2TeCl_6$ in particle form was prepared by first mixing 6.72 g of CsCl and 5.38 g of $TeCl_4$ and placing the resulting mixture into a clean, dry silica tube, which was then evacuated, heated and cooled as in Example 3, above.

EXAMPLE 5: Preparation of $Cs_2Zr_{.99}Te_{.01}Cl_6$ in Particle Form

The phosphor $Cs_2Zr_{.99}Te_{.01}Cl_6$ in particle form was prepared by first mixing 6.72 g of CsCl, .054 g $TeCl_4$ and 4.61 g $ZrCl_4$ and placing the resulting mixture into a clean, dry silica tube, which was then evacuated, heated and cooled as in Example 3, above.

EXAMPLE 6: Preparation of $Cs_2Hf_{.99}Te_{0.1}Cl_6$ in Particle Form

The phosphor $Cs_2Hf_{.99}Te_{.01}Cl_6$ in particle form was prepared by first mixing 6.72 g of CsCl, .054 gf $TeCl_4$ and 6.34 g $HfCl_4$ and placing the resulting mixture into a clean, dry silica tube, which was then evacuated, heated and cooled as in Example 3, above.

In each of the preceding examples, all steps were preformed in a dry $N_2$ atmosphere.

The foregoing describes phosphors that are particularly suitable for use in radiographic imaging systems because they can be fabricated more economically than present ceramic phosphors due to lower fabrication temperatures and are fast-acting, thereby permitting increased operating speed of a radiographic imaging system in which a phosphor (or phosphors) is utilized.

While the invention has been described with respect to specific embodiments, many modifications and substitutions of the invention will be apparent to those skilled in the art. It is, therefore, to be understood that the appended claims are intended to cover all such modifications and substitutions as fall within the true spirit and scope of the invention.

What is claimed is:

1. A photoluminescent phosphor having the formula:

$$Cs_2Hf_{1-x}Te_xCl_6 \text{ or } Cs_2Zr_{1-x}Te_xCl_6$$

wherein $0.005 \leq X \leq 0.1$, said phosphor having a purity with respect to naturally-occurring impurities of at least about 98.0% by weight and being sufficiently deficient of luminescent activators effective only at temperatures below about 77° Kelvin that said phosphor exhibits luminescence in response to X-ray bombardment at temperatures greater than about 77° Kelvin.

2. The photoluminescent phosphor of claim 1 having the formula:

$$Cs_2Hf_{1-x}Te_xCl_6$$

wherein $0.005 \leq X \leq 0.1$.

3. The photoluminescent phosphor of claim 1 having the formula:

$$Cs_2Zr_{1-x}Te_xCl_6$$

wherein $0.005 \leq X \leq 0.1$.

4. The photoluminescent phosphor of claim 1 wherein said phosphor has a purity with respect to naturally-occurring impurities of at least about 99.5%.

5. The photoluminescent phosphor of claim 1 wherein said phosphor exhibits a luminescent spectrum comprising a single, continuous, broad emission.

* * * * *